(12) United States Patent
Muller

(10) Patent No.: US 9,416,562 B2
(45) Date of Patent: Aug. 16, 2016

(54) ELECTRONIC KEY

(75) Inventor: Ulrich Muller, Velbert (DE)

(73) Assignee: HUF HULSBECK & FURST GMBH & CO. KG, Velbert (DE)

( * ) Notice: Subject to any disclaimer, the term of this patent is extended or adjusted under 35 U.S.C. 154(b) by 368 days.

(21) Appl. No.: 13/822,948

(22) PCT Filed: Dec. 14, 2011

(86) PCT No.: PCT/DE2011/075309
§ 371 (c)(1),
(2), (4) Date: Jun. 10, 2013

(87) PCT Pub. No.: WO2012/089204
PCT Pub. Date: Jul. 5, 2012

(65) Prior Publication Data
US 2013/0263632 A1    Oct. 10, 2013

(30) Foreign Application Priority Data

Dec. 21, 2010   (DE) .......................... 10 2010 061 457

(51) Int. Cl.
*A47G 29/10*     (2006.01)
*E05B 19/00*     (2006.01)
(Continued)

(52) U.S. Cl.
CPC ........ *E05B 19/0082* (2013.01); *G07C 9/00944* (2013.01); *G07C 2009/00952* (2013.01);
(Continued)

(58) Field of Classification Search
CPC ............ E05B 19/0082; G07C 9/00944; G07C 2009/00952; Y10T 70/7831; Y10T 70/8676; Y10T 70/8757; H01M 2/1022; H01M 2/1038; H01M 2/1044; H01M 2/1066

USPC ........... 70/257, 456 R, 459; 429/96, 100, 186
See application file for complete search history.

(56) References Cited

U.S. PATENT DOCUMENTS

2005/0223766 A1* 10/2005 Hashimoto et al. .......... 70/456 R
2007/0223152 A1*  9/2007 Murakami et al. ................ 361/1
(Continued)

FOREIGN PATENT DOCUMENTS

DE    10 2006 023 143 A1    11/2007
DE    10 2006 046 801 A1     4/2008
(Continued)

OTHER PUBLICATIONS

The International Search Report as mailed on Mar. 20, 2012 for International Application No. PCT/DE2011/075309.
(Continued)

*Primary Examiner* — Lloyd Gall
(74) *Attorney, Agent, or Firm* — Quarles & Brady LLP

(57) ABSTRACT

An electronic key for wireless operation of a lock with a housing shell for g circuit electronics, wherein the housing shell—has a battery compartment, a battery compartment cover, an emergency key which has a key stem insertable into the housing shell for mechanical operation of the lock, wherein the key stem is movable between an insertion position, in which the key stem is fitted on a key shaft of the housing shell, and an end position in which the key stem is securely accommodated in the key shaft, and a seal arranged between the housing shell and the battery compartment cover for protecting the battery against environmental influences, wherein the battery compartment cover has a bearing surface for direct contact on the key stem, and, in the end position, the key stem exerts a contact pressure force against the seal via the bearing surface of the battery compartment cover.

8 Claims, 4 Drawing Sheets

(51) Int. Cl.
*G07C 9/00* (2006.01)
*H01M 2/10* (2006.01)
(52) U.S. Cl.
CPC ........... *H01M2/1022* (2013.01); *H01M 2/1044* (2013.01); *H01M 2/1066* (2013.01); *Y10T 70/7831* (2015.04); *Y10T 70/8676* (2015.04); *Y10T 70/8757* (2015.04)

(56) References Cited

U.S. PATENT DOCUMENTS

2009/0145187 A1* 6/2009 Deppner et al. ............... 70/448
2013/0044446 A1* 2/2013 Montarou .................... 361/752

FOREIGN PATENT DOCUMENTS

| | | |
|---|---|---|
| EP | 0 577 878 A1 | 1/1994 |
| EP | 1 944 818 A2 | 7/2008 |
| JP | 2004 052471 A | 2/2004 |
| JP | 2009 293247 A | 12/2009 |
| WO | 2008/040269 A1 | 4/2008 |
| WO | 2009/124572 A1 | 10/2009 |
| WO | 2009/127227 A1 | 10/2009 |
| WO | 2009127227 A1 | 10/2009 |

OTHER PUBLICATIONS

Search Report issued in connection with German Patent Application 10 2010 061 457.2.

* cited by examiner

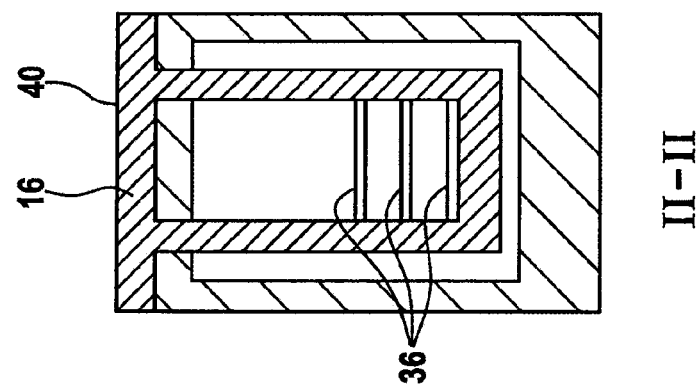
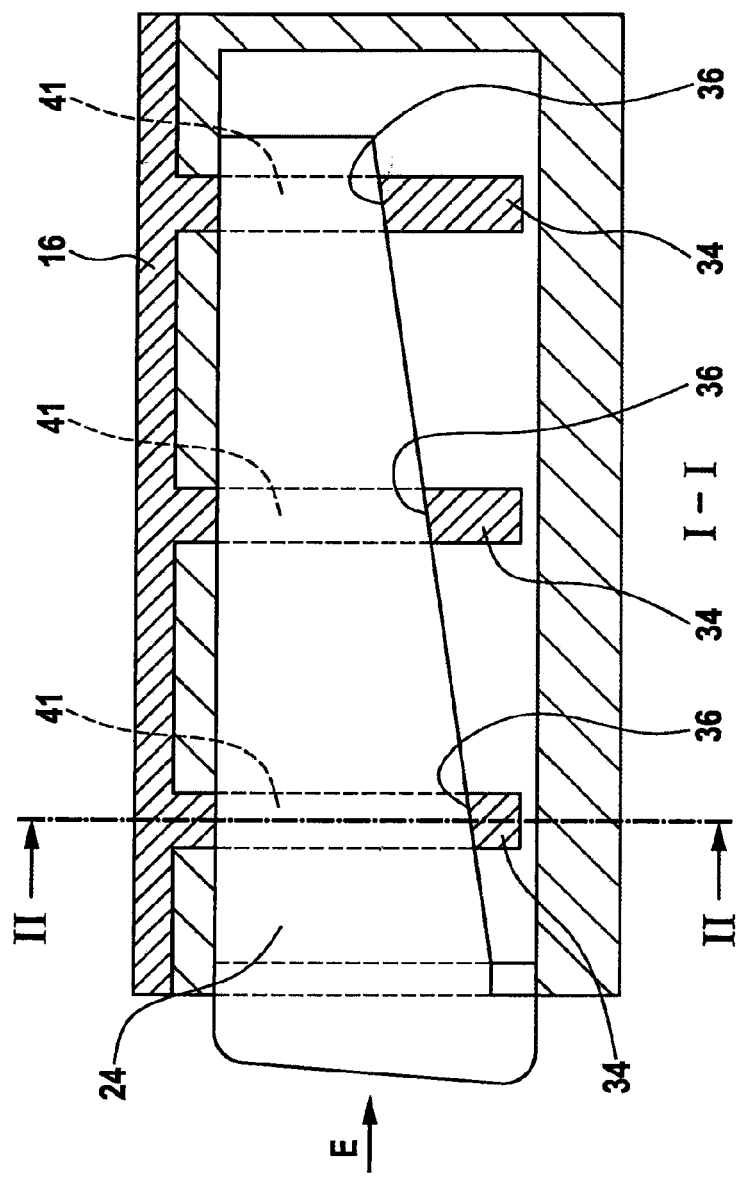

ELECTRONIC KEY

CROSS-REFERENCE TO RELATED APPLICATIONS

This application represents the national stage entry of PCT International Application No. PCT/DE2011/075309 filed on Dec. 14, 2011, and claims the benefit of German patent application no. 10 2010 061 457.2 filed on Dec. 21, 2010. The disclosure of each of these applications is hereby incorporated by reference as if set forth in their entirety herein.

BACKGROUND

The invention relates to an electronic key by means of which a lock, in particular a motor vehicle lock of a motor vehicle, can be opened and/or closed wirelessly, for instance by radio.

DE 10 2006 046 801 A1 discloses an electronic key in which a housing shell for the accommodation of electronic switching circuitry has a key shaft for the accommodation of a key stem of an emergency key. The housing shell further has a battery compartment into which a button cell for supplying power to the electronic switching circuitry is inserted. The button cell is covered by a battery compartment cover. The battery compartment cover has a shaft which can be embodied as part of the key shaft. For this purpose, the battery compartment cover can be pushed into the housing shell against a spring force of a contact spring acting on the battery, the key stem only thereafter being insertable into the shaft. Upon the release the battery compartment cover, the contact spring pushes the shaft of the battery compartment cover against the key stem, thus forming a loss prevention device for the battery compartment cover by means of the key stem accommodated in the shaft.

There is a continuing requirement for reducing the risk of a loss of operability of an electric key.

SUMMARY

It is the object of the invention to provide an electric key which offers a low risk of loss of operability.

The object is achieved according to the invention.

The electronic key according to the invention for the wireless operation of a lock, in particular a motor vehicle lock, has a housing shell for the at least partial accommodation of electronic switching circuitry for the wireless operation of the lock, the housing shell having a battery compartment for the accommodation of a battery for supplying power to the electronic switching circuitry. Additionally, a battery compartment cover for covering the battery accommodated in the battery compartment and an emergency key, with a key stem that is insertable into the housing shell, for the mechanical operation of the lock are provided, the key stem being movable between an insertion position in which the key stem is located on a key shaft of the housing shell, and an end position in which the key stem is securely accommodated in the key shaft. According to the invention, a seal for protecting the battery against environmental influences is arranged between the housing shell and the battery compartment cover, the battery cover having a bearing surface for direct contact with the key stem and the key stem in the end position exerting a pressure force through the bearing surface of the battery compartment cover on the seal.

Upon insertion into the key shaft of the housing shell, the key stem of the emergency key can exert a force via the bearing surface onto the battery compartment cover in order to compress the seal between the battery compartment cover and the housing shell such that a high level of impermeability can result automatically, based on which the electronic key can be waterproofed at least in the region of the battery compartment. The risk of loss of operability of the electric key, for example as a result of penetration by water, is thus reduced. A further consideration is that a common situation in which the emergency key is required is when the battery power of the battery no longer suffices for the usual mode of operation of the electronic key. The use of the emergency key thus enables easy access to the battery in the battery compartment in order to replace the battery fast and easily.

The battery compartment cover can be jammed, wedged and/or locked by means of the key stem. In the end position, the key stem can be accommodated by the housing shell in such a way that the emergency key cannot fall out of the housing shelf by itself, for instance as a result of its own weight. The key stem is, for instance, held by the housing shell by means of friction and/or is locked in a form-fitting manner by means of a retaining means, for instance a clip of a clip connection. In the insertion position, the key stem, when introduced into the housing shell, is located with its tip a short distance away from the key shaft and is just being threaded into the key shaft. After departing from the insertion position in the introduction direction, the further movement of the key stem is limited and in particular guided by the key shaft. The key stem can, for instance, be pushed into the key shaft of the housing shell with an essentially longitudinally-directed movement component in the direction of the extent of the key shaft and subsequently exert a force on the bearing surface of the battery compartment cover by means of a swivel motion effected transversely to the longitudinal extent of the key shaft and/or a rotation about a rotational axis along the longitudinal extent of the key shaft. The battery compartment cover can, in this way, be pressed against the housing shell via the seal by means of the pressure force, it being possible for the battery compartment cover to be directly functionally connected to the housing shell via the seal or indirectly functionally connected to the housing shell via at least one additional intermediate component, for instance a reciprocal shell corresponding to the housing shell.

The electronic switching circuitry can be accommodated between the housing shell and a reciprocal shell corresponding to the housing shell, wherein the housing shell and/or the reciprocal shell can themselves be provided within another component. The electronic switching circuitry can comprise a transmitter/receiver for communicating wirelessly, for instance by radio, with an electronic lock, in particular a motor vehicle lock. This enables an identification and/or authorization for the opening and/or closing of the lock to be checked and an opening/closing of the lock to be initiated or refused. The battery can be a rechargeable battery (accumulator) and/or is preferably embodied as a button cell, which saves on installation space. The seal is, for instance, an annular cord packing made preferably from a workable, in particular an elastic material. The seal can preferably be rubber-like elastic and deformable during the application of the pressure force in order to produce the maximum possible sealing performance.

The battery compartment cover has preferably an in particular eyelet-shaped lug for the formation of the bearing surface. The lug can, for instance, be L-shaped or U-shaped. The flow of force from the key stem to the battery compartment cover can be routed via the lug. In particular, the bearing surface can extend essentially parallel with an exterior surface of the battery compartment cover that faces away from the battery compartment. By means of the lug it is possible to pull the battery compartment cover toward the housing shell without any structural complications. Pushing the battery compartment cover outward against an undercut is not necessary.

In particular, the bearing surface of the battery compartment cover forms a part of a border of the key shaft. The bearing surface can be integrated into the embodiment of the key shaft. The bearing surface extends preferably somewhat into the key shaft, such that the key stem, when inserted into the housing shell, can displace the bearing surface and thus builds up the pressure force necessary for the compression of the seal. In particular, the key stem can be automatically threaded into an in particular eyelet-shaped lug of the battery compartment cover by means of the movement of said key stem within the key shaft of the housing shell, the lug embodying the bearing surface.

It is particularly preferred that the key stem is shaped such that the force that can be exerted on the bearing surface of the battery compartment cover by the key stem is increased between the insertion position and the end position. In particular, the force exerted on the battery compartment cover by the key stem can be gradually increased, such that the pressure force on the seal can be increased essentially uniformly. A sudden increase in the pressure force can be avoided, enabling the seal to deform gradually under the increasing pressure force and to thus produce a particularly high sealing performance.

A preferred embodiment provides that the key shaft enables and/or forces a rotation of the key stem during a movement between the insertion position and the end position. The key stem can, for instance, be forced into a rotation about its longitudinal extent by means of a tortuous guidance of the key stem in the shaft. The rotation of the key stem can exploit the fact that the cross section of key stem is usually rectangular, and thus the key stem can be inserted into the key shaft with its short extent between the housing shell and the battery compartment cover without great resistance and, following a rotation of, for instance, up to 90 .degree.+/−5 .degree., can be positioned in the end position with its wide extent between the housing shell and the battery compartment cover. Any pre-existing clearance can thereby be eliminated, and thus the key stem is accommodated by means of friction fitting, in particular by a press fit, in the housing shell. In this configuration, the key stem can jam and/or lock the battery compartment cover and simultaneously exert sufficient pressure force on the seal via the battery compartment cover.

In particular, the key stem is connected to a key bow, the key bow in the end position of the key stem being integrated flush with the surface outline of the housing shell. By means of the key bow, an adequate lever length can be provided for rotating the key stem within the housing shell. In particular, an adequate pressure force on the seal can be realized by means of the lever action of the key bow. In particular, the key stem can be easily jammed by friction within the housing shell by means of a press fit. As a result of the key bow being integrated with the outline shape, an end position is created which is intuitively recognizable by the user, and in which the user would not rotate the emergency key any further. At the same time, the key bow enables easy handling of the emergency key, for instance when the battery power is too low for the use of the electronic switching circuitry and the lock requires manual opening and/or closing by means of the emergency key.

Preferably, the housing shell and/or the battery compartment cover have at least one ramp for the forced guidance of the key stem, in particular for increasing the pressure force exertable by the key stem on the seal. By means of the ramp any clearance between the key stem and the housing shell and/or the battery compartment cover can be reduced and in particular eliminated. By means of the ramp the key stem can be pressed onto the bearing surface of the battery compartment cover and/or the force exertable on the bearing surface can be increased. In particular, by means of the ramp a relative movement of the battery compartment cover with reference to the housing shell can be forced, such that the seal can be compressed with an accordingly high pressure force.

It is particularly preferable that the battery compartment cover is pivotably connected to the housing shell about a pivot axis, the battery compartment being provided between the pivot axis and the key shaft. The battery compartment cover is in particular pivotable within a limited angular range via a lip inserted into a slot.

As a result of the battery compartment being provided between the pivot axis and the key shaft, an accordingly high pressure force can be achieved in the region of the battery compartment by means of the leveraging effect during a pivoting movement of the battery compartment cover caused by the key stem being inserted. Furthermore, a freely projecting lip which can spring back with corresponding intensity is thus avoided. In the end position of the key stem, the battery compartment cover can be clamped in both the region of the pivot axis and also in the region of the key shaft, and absorb the forces exerted on the battery and/or the seal.

The housing shell has, in particular, a spring element, in particular a contact spring for an electric contact with the battery, provided in the battery compartment, the spring element enabling a spring force to be exerted on the battery which counteracts the pressure force exerted by the key stem. The battery can be directly or indirectly pressed against the battery compartment cover by means of the spring element. In the end position of the key stem the battery compartment cover can thus press the battery against the electric contacts with a corresponding force and thus ensure a reliable electric contact.

The key stem is preferably made from a basic body with an essentially rectangular cross section with two narrow sides arranged opposite one another, the key stem in the end position bearing with one of the narrow sides on the bearing surface of the battery compartment cover and with the other narrow side on the housing shell. Any pre-existing clearance between the key stem and the housing shell and/or the battery compartment cover can be eliminated by a simple rotation within the key shaft such that the key stem is accommodated in the housing shell by means of friction fitting, in particular with a press fit. In this configuration, the key stem can jam and/or lock the battery compartment cover and simultaneously exert sufficient pressure force on the seal via the battery compartment cover.

In an alternative embodiment of the invention, the key shaft can enable and/or force a longitudinal guidance of the key stem during a movement between the insertion position and the end position.

It can be furthermore provided that each lug has an opening assigned to it and that the openings of the respective lugs for the feedthrough of the key stem are embodied in relatively different sizes to one another.

A particularly good and reliable sealing of the electronic key is ensured when the bearing surfaces of the lugs have a slanted cross section in the direction of insertion E of the key.

According to a further embodiment of the electronic key, the key stem has a cuneiform connection to at least one lug in at least the end position, which connection serves to increase the contact pressure exertable by the key stem on the seal.

In order to prevent the emergency key from falling out, even when exposed to considerable shock, the key can additionally be connected to the key shaft and/or the housing shell in a force-fitting and/or form-fitting manner by means of a latching connecting that is releasable by the user.

In the following, the invention is explained in more detail with reference to the attached drawings illustrating preferred exemplary embodiments, wherein the characteristics shown in the following can be an aspect of the invention both individually and in combination with one another.

BRIEF DESCRIPTION OF THE DRAWINGS

FIG. 4 shows a schematic longitudinal sectional view of an electronic key according to the invention in a third embodiment, and FIG. 5 shows a schematic cross-sectional view of an electronic key according to the invention in a third embodiment.

DETAILED DESCRIPTION

Figure 1:
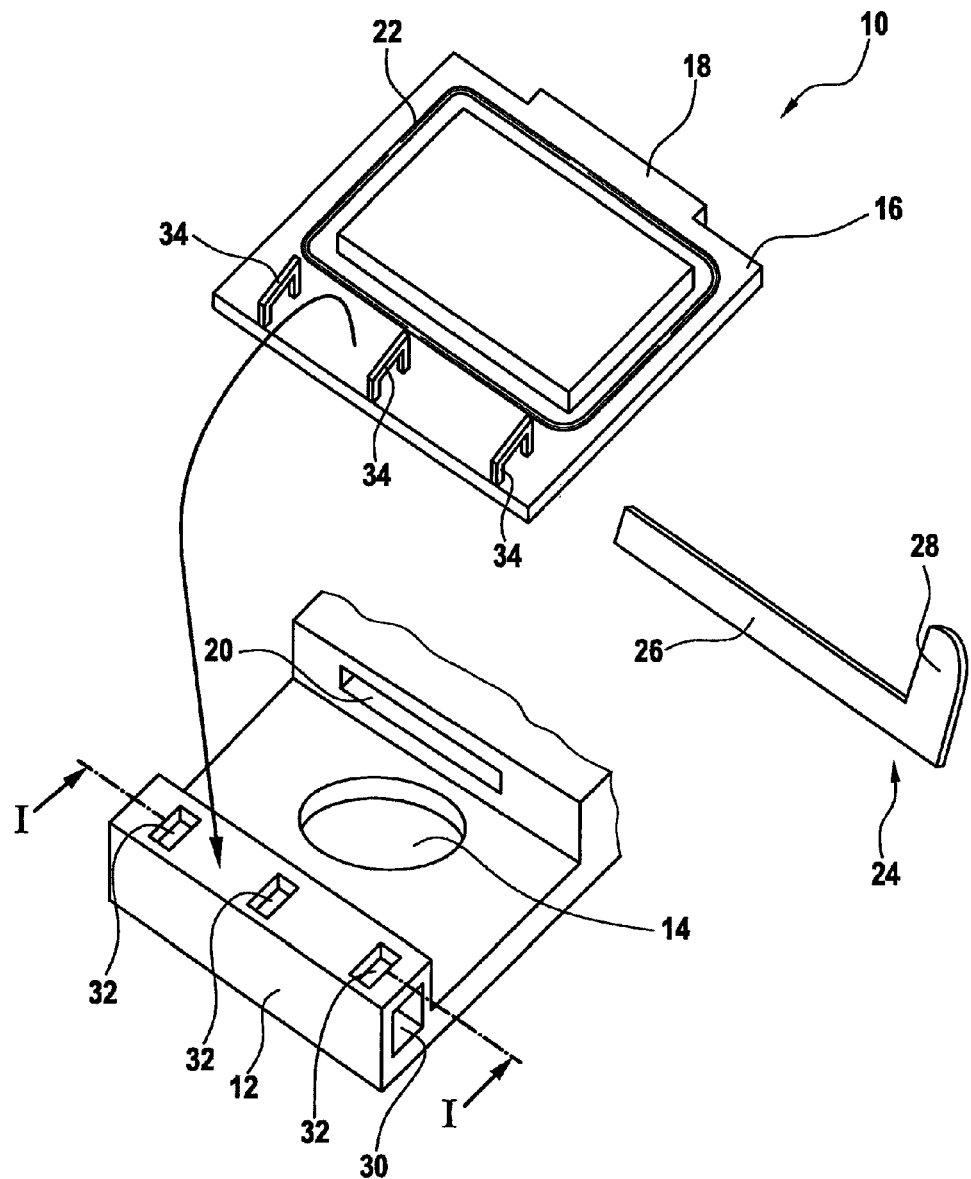
FIG. 1 shows a schematic partial illustration of different individual components of an electronic key according to the invention.

The electronic key 10 partially shown in FIG. 1 has a housing shell 12 which can accommodate electronic switching circuitry which is not illustrated. The housing shell 12 has a battery compartment 14 into which a battery, which is not illustrated, can be inserted. The battery compartment 14 can be covered by means of a battery compartment cover 16. The battery compartment cover 16 features a lip 18 which can be inserted into a corresponding slot 20 of the housing shell 12 and which thus enables a limited pivotability of the battery compartment cover 16. In the exemplary embodiment illustrated, a seal 22, which can be pressed against the housing shell 12 for the purpose of waterproofing the battery compartment cover 16, is connected to the battery compartment cover 16.

An emergency key 24 is furthermore provided which has a key stem 26. A grip 28, which can be over-molded with a key bow not illustrated, is integrally connected to the key stem 26. The emergency key 24 can be inserted with its key stem 26 into a key shaft 30 of the housing shell 12. Openings 32, into which the eyelet-shaped lugs 34 of the battery compartment cover 16 can be inserted, are connected with the key shaft 30.

Figure 2:
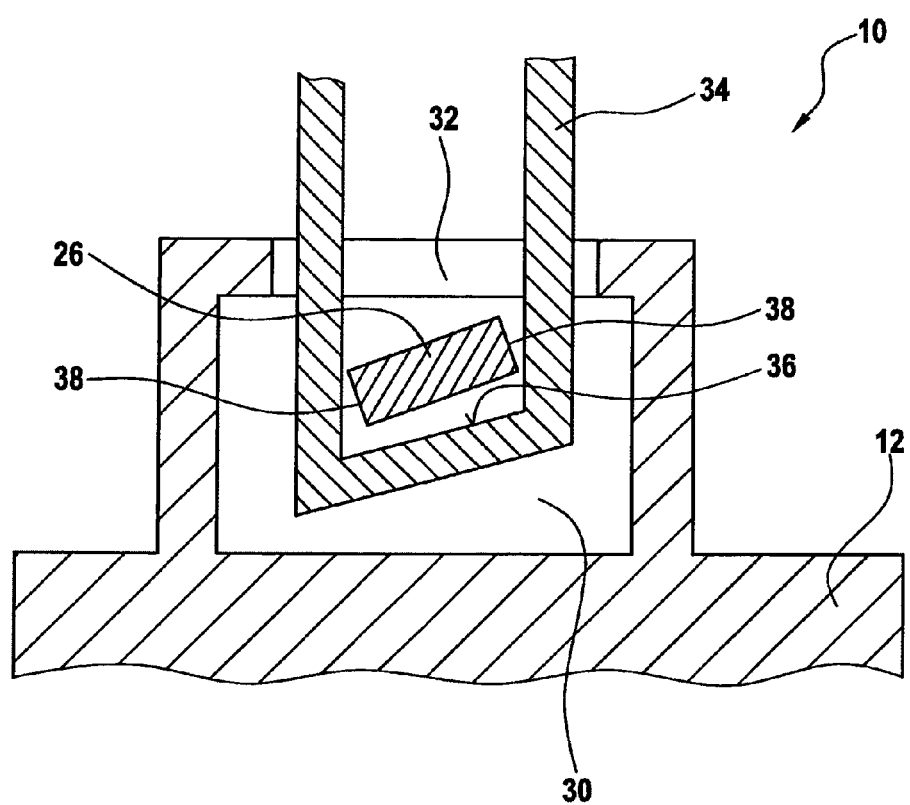
FIG. 2 shows a schematic sectional view of the electronic key shown in FIG. 1 in an assembled configuration.

As shown in FIG. 2, the lugs 34 protrude into the key shaft 30, such that the key stem 26 can be threaded into the lugs 34. The key stem 26, which has an essentially rectangular cross section, can bear on a bearing surface 36 formed by the lug 34, and by means of a rotation about its longitudinal axis bear with one narrow side 38 on the bearing surface 36 and with another narrow side 38 on one wall of the key shaft 30.

As a result, the lug 34 is pulled farther into the key shaft 30, such that a force can be exerted by the key stem 26 on the battery compartment cover 16. Thus the pressure force exerted by the battery compartment cover 16 on the seal 22 is increased, since the seal between the battery compartment cover 16 and the housing shell is being compressed. In the exemplary embodiment illustrated, the bearing surface 36 is slanted in comparison with the general geometry of the key shaft 30, such that a first rotation of the key stem 26 is forced by the lug 34. In particular, a plurality of lugs 34 with bearing surfaces 36 are provided which have increasing slant angles, in order to enable a rotation of the key stem 26 within the key shaft 30 by up to approximately 90 .degree. The same effect can be achieved by means of a corresponding shaping of the housing shell 12 in the region of the key shaft 30.

Figure 3:
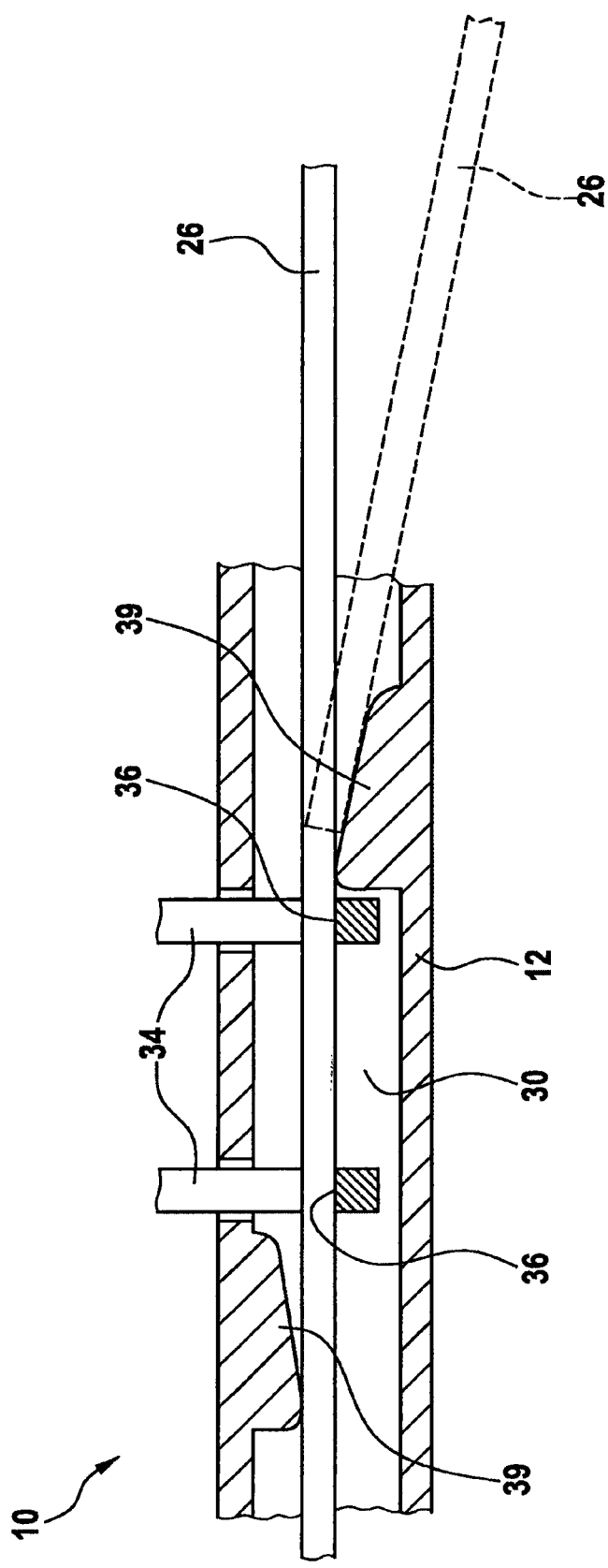
FIG. 3 shows a schematic longitudinal sectional view of an electronic key according to the invention in a second embodiment.

In the embodiment of the electronic key 10 shown in FIG. 3, ramps 39 which are formed by the housing shell 12 are provided, which ramps can additionally or alternatively also be formed by the battery compartment cover 16, in particular by the lugs 34.

When the insertion of the key stem 26 into the key shaft 30 commences, a large clearance is provided which facilitates the insertion of the key stem 26 and the threading of the key stem into the lugs 34. In the end position of the key stem 26, the key stem 26 is jammed between the ramps 39 aligned toward one another at opposing ends of the key shaft 30, the key stem 26 having earlier been able to pull the lugs 34 into the key shaft 30. In this embodiment it is not a mandatory requirement for the key stem 26 to be rotated. The bearing surfaces 36 of the lugs 34 need not be slanted.

In FIGS. 4 and 5 a third exemplary embodiment is illustrated, wherein FIG. 4 shows a sectional view I-I through the key shaft 30 shown in FIG. 1, and FIG. 5 visualizes a sectional view II-II (refer to FIG. 4) through a lug 36. In FIG. 4, the emergency key 24 embodied as a key is additionally illustrated. The design of the third exemplary embodiment remains essentially unchanged. In comparison with the first exemplary embodiment (refer to FIG. 1) the three lugs 34 assigned to the battery compartment cover 16 differ in their geometric shape, the openings 41 of the lugs 34 being embodied in relatively different sizes to one another. The bearing surfaces 36 of the lugs 34 have a slanted cross section in the direction of insertion E of the emergency key 24, the third exemplary embodiment having bearing surfaces 36 which are slanted with reference to a sectional surface plane 40 of the battery compartment cover 16. This enables and/or forces a longitudinal guidance of the key stem 26 during a movement between the insertion position and the end position. In the end position, the key stem has a cuneiform connection to all three lugs 34, which serves to increase the pressure force exertable by the key stem 26 on the seal 22. Accordingly, in the third exemplary embodiment, the key stem 26 needs only to be moved in the longitudinal direction or the direction of insertion E. The cuneiform connection between the key stem 26 and the lugs 34 further enhances user comfort, as the user can forego an additional rotational movement of the key stem 26 in order to connect the battery compartment cover 16 and the housing shell 12 with one another in a dustproof and waterproof manner.

As illustrated in FIG. 4, the emergency key 24 protrudes from the key shaft 30. In the third exemplary embodiment it is, of course, also possible to integrate the key bow of the emergency key 24 flush with the surface outline of the housing shell 12.

It can furthermore be provided for all exemplary embodiments that the emergency key 24 is additionally connected to the key shaft in a force-fitting and/or form-fitting manner by means of a latching connection that is releasable by the user. For this purpose, a slider could be located on the housing shell 12 and/or the key shaft 26, which slider can be operated externally by the user to release the latching connection between the emergency key 24 and the key shaft 26. By means of these measures it is possible to prevent the emergency key 24 from falling out even when the connection between the lugs 34 and the key shaft 26 becomes loose.

The invention claimed is:

1. An electronic key for wireless operation of a lock, in particular a motor vehicle lock, said electronic key comprising:
   a housing shell for at least partial accommodation of electronic switching circuitry for the wireless operation of the lock,
   a battery compartment disposed in the housing shell for the accommodation of a battery for supplying power to the electronic switching circuitry;
   a battery compartment cover for covering the battery compartment, the battery compartment cover comprising an eyelet-shaped lug;
   an emergency key for mechanical operation of the lock, said emergency key having a key stem insertable into the housing shell and being movable between an insertion position in which the key stem is located on a key shaft of the housing shell, and an end position in which the key stem is securely accommodated in the key shaft; and
   a seal arranged between the housing shell and the battery compartment cover, said seal protecting the battery compartment against environmental influences, the eyelet-shaped lug in the battery compartment cover forming a bearing surface for direct contact on the key stem, and the key stem in the end position exerting a pressure force through the bearing surface of the battery compartment cover on the seal.

2. The electronic key as claimed in claim 1, in which the key shaft enables and/or forces a longitudinal guidance of the key stem during a movement between the insertion position and the end position.

3. The electronic key as claimed in claim 1, in which the key stem is connected to a key bow, the key bow in the end position of the key stem being integrated flush with a surface outline of the housing shell.

4. The electronic key as claimed in claim 1 in which at least one of the housing shell and the battery compartment cover has at least one ramp for the forced guidance of the key stem for increasing the pressure force exertable by the key stem on the seal.

5. The electronic key as claimed in claim 1 in which the battery compartment cover is pivotably connected to the housing shell about a pivot axis, the battery compartment being provided between the pivot axis and the key shaft.

6. The electronic key as claimed in claim 1, in which the key stem includes a body having an essentially rectangular cross section with two narrow sides arranged opposite one another, the key stem in the end position bearing with one of the narrow sides on the bearing surface of the battery compartment cover and with the other narrow side on the housing shell.

7. An electronic key for wireless operation of a lock, in particular a motor vehicle lock, said electronic key comprising:
   a housing shell for at least partial accommodation of electronic switching circuitry for the wireless operation of the lock,
   a battery compartment disposed in the housing shell for the accommodation of a battery for supplying power to the electronic switching circuitry;
   a battery compartment cover covering the battery compartment;
   an emergency key for mechanical operation of the lock, said emergency key having a key stem insertable into the housing shell and being movable between an insertion position in which the key stem is located on a key shaft of the housing shell, and an end position in which the key stem is securely accommodated in the key shaft; and
   a seal arranged between the housing shell and the battery compartment cover, said seal protecting the battery compartment against environmental influences, the battery compartment cover having a bearing surface forming a part of a border of the key shaft for direct contact on the key stem, and the key stem in the end position exerting a pressure force through the bearing surface of the battery compartment cover on the seal, and wherein at least one of the housing shell and the battery compartment cover has at least one ramp for the forced guidance of the key stem for increasing the pressure force exertable by the key stem on the seal.

8. An electronic key for wireless operation of a lock, in particular a motor vehicle lock, said electronic key comprising:
   a housing shell for at least partial accommodation of electronic switching circuitry for the wireless operation of the lock,
   a battery compartment disposed in the housing shell for the accommodation of a battery for supplying power to the electronic switching circuitry;
   a battery compartment cover covering the battery compartment;
   an emergency key for mechanical operation of the lock, said emergency key having a key stem insertable into the housing shell and being movable between an insertion position in which the key stem is located on a key shaft of the housing shell, and an end position in which the key stem is securely accommodated in the key shaft, the key stem being shaped in such a way that the force that can be exerted on a bearing surface of the battery compartment cover by the key stem is increased between the insertion position and the end position; and
   a seal arranged between the housing shell and the battery compartment cover, said seal protecting the battery compartment against environmental influences, the bearing surface for direct contact on the key stem, and the key stem in the end position exerting a pressure force through the bearing surface of the battery compartment cover on the seal, and wherein at least one of the housing shell and the battery compartment cover comprises a ramped surface for increasing the pressure force exertable by the key stem on the seal.

* * * * *